United States Patent Office 3,428,906
Patented Feb. 18, 1969

3,428,906
WIDE BAND FREQUENCY MODULATED
SIGNAL DETECTOR
Mario Pozzetti, Monza, Italy, assignor to Societá Italiana
Telecomunicazioni Siemens S.p.A.
Filed Nov. 22, 1965, Ser. No. 509,074
Claims priority, application Italy, Nov. 20, 1964,
24,984/64
U.S. Cl. 329—163                 16 Claims
Int. Cl. H03d 1/18

ABSTRACT OF THE DISCLOSURE

A discriminator circuit for the reception of frequency modulated signals comprises a bridge circuit having four resistance arms one of which is the input. Two reactance circuits are connected between opposite corners of the bridge and form the two diagonals of the bridge. Each reactance has at least two individual points the first of which is a pole and the second of which is a zero with respect to a peak of the desired discrimination characteristic. The pole of one reactance corresponds to the zero of the second reactance and vice versa. Thus, the output voltage of the discriminator is obtained by the difference between the absolute values of the voltage across the ends of the bridge sides adjacent to the side on which the input voltage is applied.

The present invention relates to a discriminator circuit of new design and specifically to a discriminator circuit for the reception of frequency modulated oscillations to be used expressly as a wide band discriminator in multichannel point to point radio links.

The frequency modulation technique is, at present, largely used in the radio field and it is universally adopted in radiotelephone links.

Two types of discriminator circuits are used most often for detection of frequency modulated oscillations, the first comprising two staggered resonators and the second designed by Foster-Seely.

These circuits, as all discriminator circuits, comprise a network sensitive to frequency variations, followed by a suitable amplitude detector. They are placed directly across the output of electronic tubes or transistors because their output capacitance can be included in the network which is sensitive to frequency. This capacitance has no effect on the operation when electronic tubes are used, but it has a very pronounced effect on the operating conditions when transistors are used, because their output capacitance is variable with the temperature, with the power supply etc. These variations deteriorate the discriminator characteristic, causing distortions of the amplitude characteristic and displacing the center point of the detection characteristic.

In wide band discriminators (employed in multichannel radio links) the output capacitance of the generator constitutes, substantially, about the total input capacitance of the network which is sensitive to the frequency, and therefor causes the above-mentioned troubles.

Both in the Foster-Seely discriminator and in the staggered resonator discriminator, the parasitic capacitances of the diode detectors of the discriminators are also included in the parameters of the network which is sensitive to frequency and constitute the cause of characteristic alteration when said capacitances are not stable under the operating conditions (for instance: when tube diodes are replaced by semiconductors).

In order to overcome the difficulties above-mentioned, complex circuits are required, consisting of compensating systems inserted in the networks, or thermostatic devices to maintain the temperature of semiconductors constant. A regulated power supply is also required to maintain the voltages applied to the circuit at a constant value.

It should be noted also that, in the case of the discriminator with two staggered resonators, a solution commonly used to drive the discriminator with two separate generators. This facilitates the decoupling but produces further instability in the discriminator characteristic, particularly when electronic tubes are used, due to the different aging law of the two generators.

Accordingly, this invention comprises a discriminator which eliminates the drawbacks hereinabove mentioned. The discriminator described hereinafter does not include the parasitic capacitances of the driving generator and the diode detectors in the reactance of its network which is sensitive to frequency. More particularly, the invention provides a network, sensitive to frequency, in the form of a balanced bridge circuit, which comprises four resistance arms and two reactances connected between the bridge corners along the bridge diagonals. One of these reactances presents a pole in relation with the first peak and the next zero in relation to the second peak of the expected discriminator characteristic, while the other reactance presents a zero, in relation to the first peak and the next pole, in relation to the second peak of said discriminator characteristic. The output voltage from the discriminator is obtained from the voltage difference between the absolute values of the voltage across the ends of the bridge sides adjacent to the input side by means of usual diode detection acting on said sides and, according to the invention, by connecting an inductor to the input terminals of the circuit to present negligible impedance over the frequency band of the detected signal.

The arrangement above described provides the following advantages: the output capacitance of the generator does not present a reactance for the network which is sensitive to the frequency of the discriminator; the input impedance of this discriminator is a pure ohmic resistance and makes up a load impedance for the driving generator; each bridge side is not coupled with the opposite side.

According to a preferred embodiment of the invention, the bridge is formed with four resistors of equal value; the first diagonal of the bridge having an inductor carrying a capacitor in parallel therewith, the parallel combination having a capacitor in series therewith, connected to two opposite corners of the bridge. In the second diagonal there is a second inductor with a capacitor in parallel therewith, the parallel combination having an inductor in series therewith connected to the other two corners of the bridge.

Another embodiment of the invention is provided by eliminating, in the above-described circuit, one or both resistors forming the input side and the opposite sides. With such arrangement, the slope of the discriminator characteristic becomes higher but the coupling between the bridge sides is increased.

Allowing a small degradation in the coupling and in the constancy of the input impedance of the bridge, it is possible to have a nearly perfect balancing condition in order to improve the discriminator linearity. An increase in the linearity can be obtained, for instance, without perfect correspondence of the singular points of the two reactances forming the diagonals of the bridge.

The advantages of the invention will appear more clearly upon consideration of the description of an example, taken in connection with the drawings, in which:

FIGURE 1a is a schematic diagram of a discriminator, according to the invention.

FIGURE 1b reproduces the bridge as a part of the circuit of FIGURE 1a.

Figure 1A:
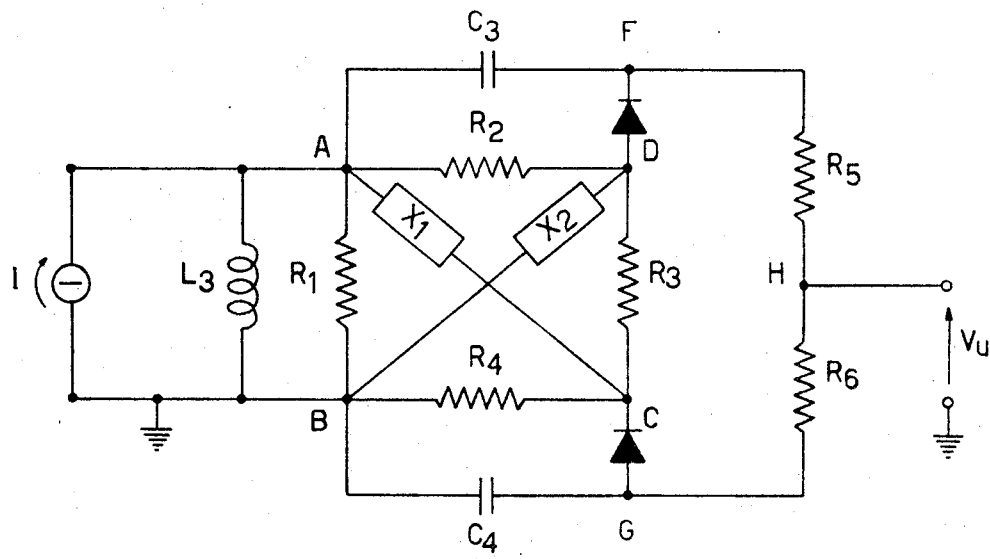
Figure 1B:
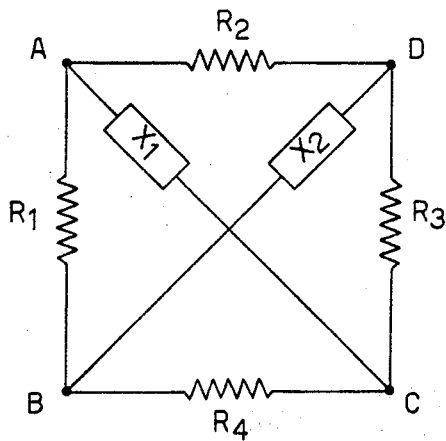

Referring now to FIGURE 1a and particularly to the bridge network shown in FIGURE 1b, making suitable choice of resistors $R_1$, $R_2$, $R_3$, $R_4$ and reactances $X_1$ and $X_2$, the impedance of the bridge, seen toward each of resistors $R_1$, R, $R_3$, $R_4$, is constant with frequency and each side is not coupled with the opposite side. For this purpose $R_1$, $R_2$, $R_3$, $R_4$, are of equal value R, and $X_1$, $X_2$ are chosen so that the product $X_1 \cdot X_2$ equals $-R^2$, ragardless of frequency obtaining therewith the balancing condition of the bridge. In this fashion the input impedance on each of the resistances is constant and equal to $R/2$ and each side of the bridge is not coupled with the opposite side thereof. (When a voltage generator is connected in series with a bridge arm, on the opposite side no current flows therethrough.)

Still referring to FIGURE 1a, it is to be noted that the voltage, across the terminals of capacitor $C_3$, corresponds to the module of voltage $V_{AD}$, i.e. $V_{AF} = |V_{AD}|$. Similarly $V_{BC} = -|V_{BG}|$. If only the voltages of received signals are considered, making the impedance of L negligible inside that frequency band, there is obtained: $V_{AF} = V_{BF}$.

If $R_5 = R_6$ then: $V_u$ (output voltage) =

$$V_{BH} = \frac{|V_{AD}| - |V_{BC}|}{2}$$

as may be proved.

Figure 2A:
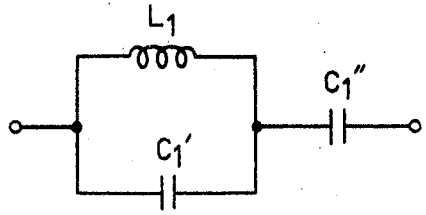
FIGURES 2a and 2b show a particular form of reactances $X_1$ and $X_2$.
Figure 2B:
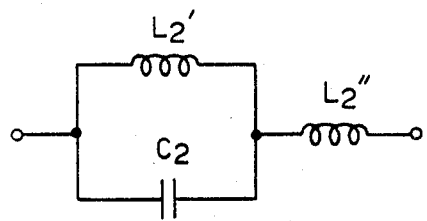

FIGURE 2a shows a combination of elements in order to provide $X_1$ of FIGURES 1a and 1b and FIGURE 2b illustrates the elements composing $X_2$ of FIGURES 1a and 1b. The expression $X_1 \cdot X_2 = R^2$, when the frequency is varied, is satisfied when $X_1$ and $X_2$ have such values that the pole of $X_1$ corresponds to zero of $X_2$ and vice versa.

Figure 3:
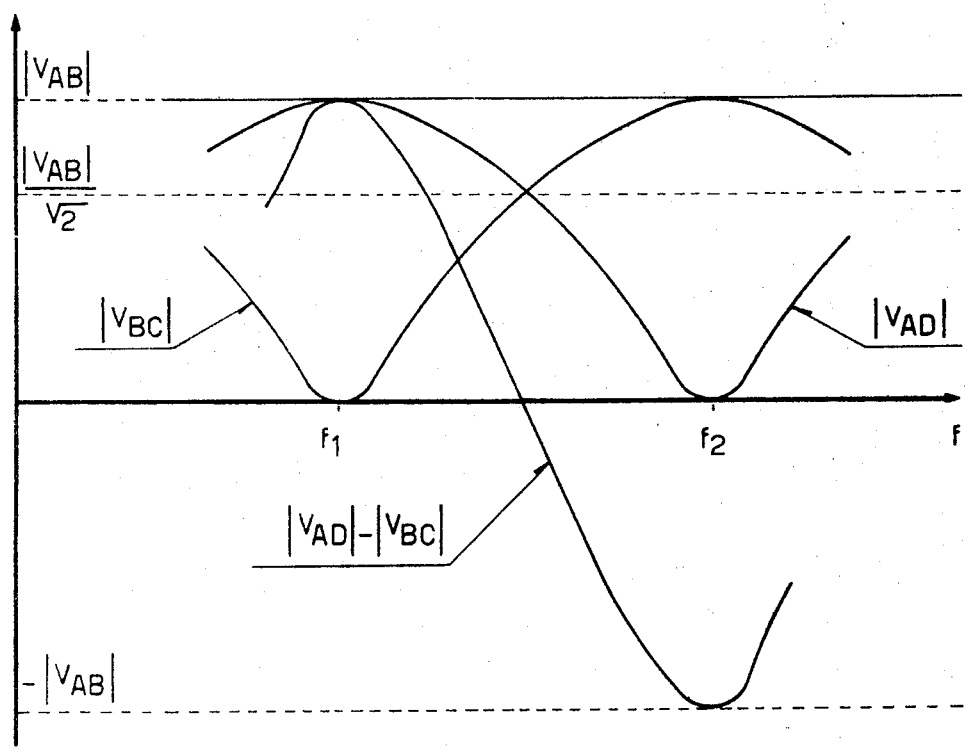
FIGURE 3 shows the module variations of the voltages $V_{AD}$, $V_{BC}$ and their difference with frequency.

The curves of FIGURE 3 show the voltage changes between points A and F and between C and B with frequency, the voltages being equal to the modules of voltages $V_{AD}$ and $V_{BC}$. A curve showing the voltage difference $|V_{AD}| - |V_{BC}|$ equal to $2V_u$, as above stated, is illustrated in the same FIGURE 3. This curve shows the typical discriminator characteristic. In order that such characteristic cover the frequency band required, the correspondence between individual points of $X_1$ and $X_2$, as above stated, should appear at frequency $f_1$ and $f_2$ of the peaks of the discriminator characteristic. More exactly, $f_1$ should be the pole of $X_1$ and zero of $X_2$ and $f_2$ should be the zero $X_1$ and the pole of $X_2$. It will be noted that the curve $|V_{AD}| - |V_{BC}|$ in FIGURE 3 is plotted for an input voltage $|V_{AB}|$ of constant value with frequency variations. When this does not occur, all the curves and particularly the curve $|V_{AD}| - |V_{BC}|$ will be affected by variations proportional to $|V_{AB}|$.

This performance could be properly adopted when an improvement in the discriminator linearity is required, by causing a suitable distortion in the amplitude response of the I.F. amplifier, preceding the discriminator circuit.

Figure 4:
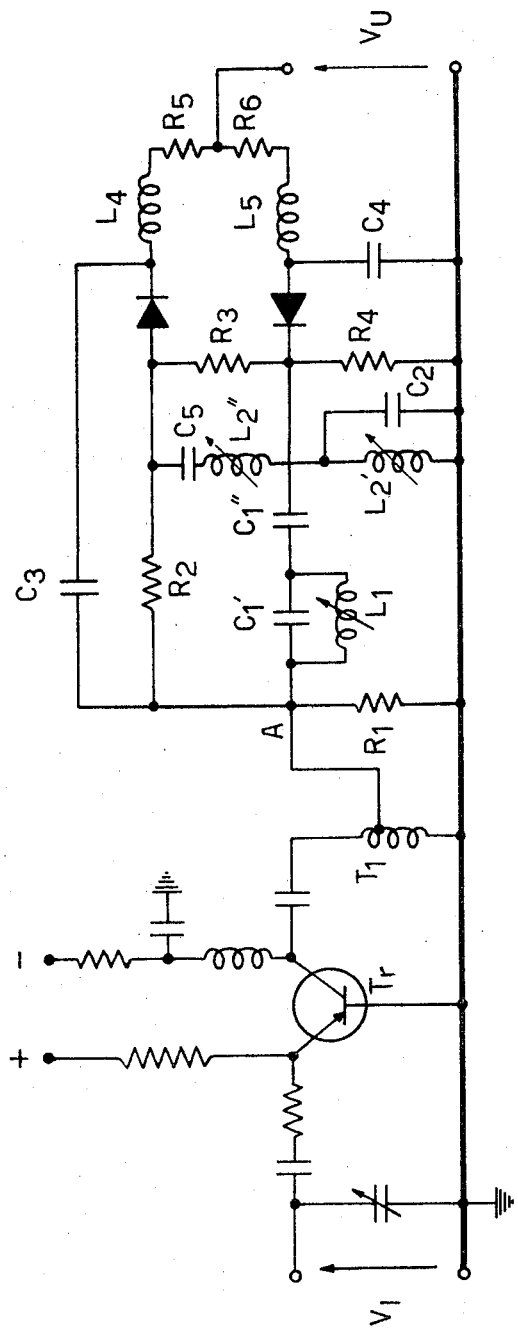
FIGURE 4 shows a circuit diagram comprising the discriminator of the present invention connected to a driving generator.

In FIGURE 4 is illustrated, as an example, a discriminator circuit which includes a pilot generator. A transformer $T_1$ couples the transistor $Tr$ to the input of the discriminator through a series tuned circuit including the output capacitance of said transistor which is mounted with the base in common. Transformer $T_1$ also connects point A to ground for the frequencies of the detected signal and matches the load to the transistor collector. Capacitor $C_5$, in series with reactance $X_2$, formed by $$L''_2 - C_2 - L'_2$$

is a by-pass for the I.F. input signal, and has been inserted to make the load conditions of the two diodes equal on the useful band. The two choke coils $L_4$ and $L_5$ are included mainly in order to prevent the I.F. input signal from reaching the discriminator output.

From a discriminator embodying the principles above stated, a linear characteristic with a slope less than 1% was obtained for a band extending ⅓ of the distance between the peaks.

The stability in time and with temperature and supply voltage variations of the characteristic was very high in relation to the stability of the passive elements forming reactances $X_1$ and $X_2$.

It is also possible to remove one or both resistors $R_1$ and $R_2$ from the bridge circuit. As hereinbefore mentioned, this removal has the effect of increasing the slope of the discriminator characteristic; however, the coupling between bridge arms is also modified.

While the invention has been described above in connection with a specific embodiment, various changes may be made without departing from the scope of the invention.

What is claimed is:

1. A discriminator circuit for the reception of frequency modulated signals comprising a bridge circuit, said bridge being formed by four resistance arms, one said arm being an input side, said bridge having two reactance circuits connected between opposite corners of said bridge and forming the two diagonals of the bridge, each reactance having at least two individual points, the first a pole and the second a zero in relation with a peak of the desired discrimination characteristic, the pole of one reactance corresponding to the zero of the second reactance and vice versa, the output voltage from the discriminator being obtained by the difference between the absolute values of the voltage across the ends of the bridge sides adjacent to the side on which the input voltage is applied.

2. A discriminator circuit, according to claim 1, wherein across the input side of the bridge there is connected a high impedance inductor for the input signal frequencies which presents negligible inductance for the output signal frequencies.

3. A discriminator circuit, according to claim 1, wherein the four arms of the bridge circuit comprise four resistors of equal value.

4. A discriminator circuit, according to claim 2, wherein the four arms of the bridge circuit comprise four resistors of equal value.

5. A discriminator circuit, according to claim 1, wherein the two arms of the bridge network adjacent to the input side comprise equal value resistors, while at least one of the other two sides has infinite impedance.

6. A discriminator circuit, according to claim 2, wherein the two arms of the bridge network adjacent to the input side comprise equal value resistors, while at least one of the other two sides has infinite impedance.

7. A discriminator circuit according to claim 1 wherein one of the diagonals of the bridge network comprises an inductor carrying a capacitor in parallel, the parallel combination having a capacitor in series therewith, the second diagonal comprising a second inductor carrying a capacitor in parallel, the parallel combination having an inductor in series therewith.

8. A discriminator circuit according to claim 2 wherein one of the diagonals of the bridge network comprises an inductor carrying a capacitor in parallel, the parallel combination having a capacitor in series therewith, the second diagonal comprising a second inductor carrying a capacitor in parallel, the parallel combination having an inductor in series therewith.

9. A discriminator, according to claim 1, further including a pilot generator having an output transformer, the output transformer of the pilot generator being used also as an inductor and presenting negligible impedance at the frequencies of the received signal and coupled across said input side.

10. A discriminator, according to claim 2, further including a pilot generator having an output transformer, the output transformer of the pilot generator being used also as an inductor and presenting negligible impedance at the frequencies of the received signal and coupled across said input side.

11. A discriminator circuit, according to claim 7, wherein the two arms of the bridge network adjacent to the input side comprise equal value resistors, while at least one of the other two sides has infinite impedance.

12. A discriminator circuit, according to claim 8, wherein the two arms of the bridge network adjacent to the input side comprise equal value resistors, while at least one of the other two sides has infinite impedance.

13. A discriminator according to claim 5 wherein the product of said reactances is the square of the resistance of one said resistance arm of said bridge.

14. A discriminator according to claim 6 wherein the product of said reactances is the square of the resistance of one said resistance arm of said bridge.

15. A discriminator according to claim 5 wherein a pole of one said reactance circuits is a zero of the other said reactance circuit and vice versa.

16. A discriminator according to claim 6 wherein a pole of one said reactance circuits is a zero of the other said reactance circuit and vice versa.

References Cited

UNITED STATES PATENTS

| | | | |
|---|---|---|---|
| 2,063,125 | 12/1936 | Rust | 332—47 |
| 3,110,813 | 11/1963 | Sack | 250—206 |
| 3,247,471 | 4/1966 | Buschbeck | 332—47 X |
| 3,314,025 | 4/1967 | Buschbeck | 333—75 X |

ALFRED L. BRODY, *Primary Examiner.*

U.S. Cl. X.R.

307—233; 328—144; 329—50, 110, 116; 332—47; 333—75